United States Patent
Mani et al.

(10) Patent No.: US 11,704,095 B2
(45) Date of Patent: Jul. 18, 2023

(54) DYNAMIC API BOT FOR ROBOTIC PROCESS AUTOMATION

(71) Applicant: SAP SE, Walldorf (DE)

(72) Inventors: Raghavendra Mani, Bangalore (IN); Ajay Mathur, Bangalore (IN); Piyush Gupta, Himachal Prades (IN); Prasanth Padmanabhan Menon, Kerala (IN)

(73) Assignee: SAP SE, Walldorf (DE)

(*) Notice: Subject to any disclaimer, the term of this patent is extended or adjusted under 35 U.S.C. 154(b) by 196 days.

(21) Appl. No.: 17/381,805

(22) Filed: Jul. 21, 2021

(65) Prior Publication Data

US 2023/0023382 A1    Jan. 26, 2023

(51) Int. Cl.
*G06F 8/30* (2018.01)
*G06F 9/54* (2006.01)

(52) U.S. Cl.
CPC .............. *G06F 8/311* (2013.01); *G06F 9/542* (2013.01)

(58) Field of Classification Search
CPC ....................................................... G06F 8/30
See application file for complete search history.

(56) References Cited

U.S. PATENT DOCUMENTS

| | | | |
|---|---|---|---|
| 7,340,747 B1* | 3/2008 | Zeliger | G06F 9/548 709/227 |
| 11,218,594 B1* | 1/2022 | Sekar | G06F 40/35 |
| 2011/0276475 A1* | 11/2011 | Godejohn | G06Q 40/00 705/39 |
| 2021/0357236 A1* | 11/2021 | Cohen | G06F 8/34 |
| 2022/0405064 A1* | 12/2022 | Silverstein | G06N 20/00 |

* cited by examiner

*Primary Examiner* — Jae U Jeon
(74) *Attorney, Agent, or Firm* — Schwegman Lundberg & Woessner, P.A.

(57) ABSTRACT

Techniques for implementing a dynamic API bot for robotic process automation are disclosed. In some embodiments, a computer system performs operations comprising: providing a data file having a predefined template comprising dedicated fields for an identification of an API, a type of call method, metadata identifying one or more objects, and data of the object(s); providing a low-code no-code (LCNC) development platform configured to enable a user to develop a bot by dragging and dropping application components of the bot; receiving, via the LCNC development platform, a configuration of the bot comprising a configuration of the application components of the bot and an identification of the data file; and running the bot, the bot being configured to generate a request using the data file, converting the data of the object(s) into a payload in a format required by the API based on the data file.

20 Claims, 12 Drawing Sheets

| | FILE | HOME | INSERT | DRAW | PAGE LAYOUT | FORMULAS | DATA | REVIEW | VIEW | HELP |
|---|---|---|---|---|---|---|---|---|---|---|
| | | A | | | | B | | | | |
| 1 | API NAME | | | | HTTPS://<SAP_SYSTEM_URL>/API_SUPPLIERINVOICE_PROCESS_SRV — 412 | | | | | |
| 2 | API CREDENTIAL VARIABLE | | | | APICREDENTIAL — 414 | | | | | |
| 3 | CALL METHOD | | | | POST — 416 | | | | | |
| 4 | OUTPUT PATH | | | | C://USERS/DESKTOP/OUTPUT.XLSX — 418 | | | | | |
| 5 | | | | | | | | | | |
| 6 | | | | | | | | | | |
| 7 | | | | | | | | | | |
| 8 | | | | | | | | | | |

| API INFO — 410 | METADATA — 420 | HEADER — 430 | ITEMS — 440 |

| | A | B | C | D | E | F | G |
|---|---|---|---|---|---|---|---|
| | PARENT SEQ. | CHILD SEQ. | FISCAL YEAR | COMPANY CODE | DOC. DATE | POSTING DATE | INV. PARTY |
| 1 | 0 | 1 | 2020 | 1710 | 2020-02-20 | 2020-02-20 | 17300001 |

FIG. 6

| | A | B | C | D | E | F |
|---|---|---|---|---|---|---|
| 1 | PARENT SEQ. | CHILD SEQ. | FISCAL YEAR | SUPPL. INV. ITEM | PURCH. ORDER | PURCH. ORDER ITEM |
| 2 | 1 | 1.1 | 2020 | 1 | 45000000 | 10 |
| 3 | | | | | | |
| 4 | | | | | | |
| 5 | | | | | | |
| 6 | | | | | | |
| 7 | | | | | | |
| 8 | | | | | | |

FIG. 7

DYNAMIC API BOT FOR ROBOTIC PROCESS AUTOMATION

BACKGROUND

Robotic process automation (RPA) is the practice of automating routine tasks with software robots, also referred to as bots, that perform the tasks automatically. These tasks may include transaction processing and information technology management, among others. Application Programming Interfaces (API's) are intermediaries that enable communication between two software entities. Using an API, two software programs can send and retrieve information between each other. In the world of Robotic Process Automation (RPA), API's may be used to when bots read, write, and transmit data from one system to another. Currently, the process of using an API requires a user to identify the system, application, or function that requires an API input, browse through an API catalog to find out whether a suitable API exists, get details about the API parameters and any other format requirements of the API and find out if it is feasible to call the API, write a program in a suitable programming language to call the API. The user must, within the program he or she is writing, build a payload to pass the appropriate parameters to the API. The user then runs the program, and checks if the API is called successfully and the desired outcome is achieved.

Specifically, in the RPA context, calling API's is complicated because the programmer or designer must ensure that the bots use the correct API in the correct automation situation. With even a slight change in parameters or other format requirements of the API, the bot may have to be reprogrammed. Currently, there are technical problems with configuring bots to use API's, as reprogramming a bot is a very resource intensive activity and becomes very iterative with changes to software upgrades and enhancements to API's. In addition to the issues discussed above, other technical problems may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 4 illustrates an example graphical user interface (GUI) of a predefined template of a data file in which a user may enter API information for a request to an API.

FIG. 6 illustrates an example GUI of the predefined template of the data file in which the user may enter corresponding data for one level of objects for the request to the API.

FIG. 7 illustrates an example GUI of the predefined template of the data file in which the user may enter corresponding data for another level of objects for the request to the API.

DETAILED DESCRIPTION

Figure 1:
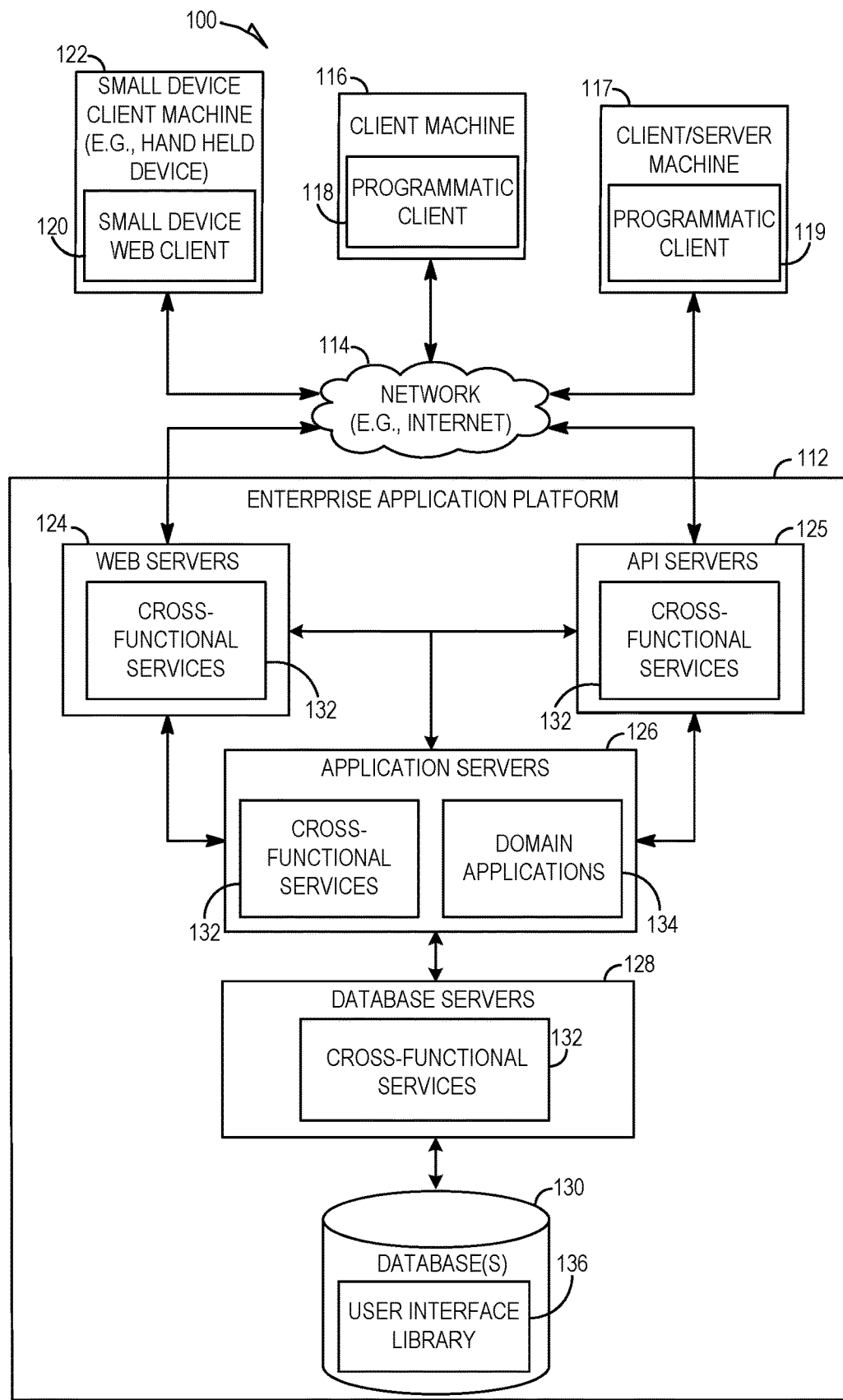
FIG. 1 is an example network diagram illustrating a system.

Example methods and systems for implementing dynamic API bots are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to provide a framework for building a dynamic API bot that enables multiple different API's to be called and used in various scenarios without a user having to rewrite the software program of the bot. The computer system may provide a data file having a predefined template in which the user may simply enter some basic data of an API, metadata of objects to be included in a payload of a request to be transmitted to the API, and data of the objects to be included in the payload of the request. The computer system may also provide a low-code no-code (LCNC) development platform in which the user may configure an application and associate the data file with the application. The computer system may then, in running the application, generate the request to be transmitted to the API, converting the data of the objects into the payload of the request in a format required by the API based on the data file.

In some example embodiments, the computer system provides, to a computing device of a user, a data file having a predefined template. The predefined template may comprise dedicated fields for an identification of an application programming interface (API), a type of call method, metadata identifying one or more objects, and corresponding data of each one of the one or more objects. Next, the computer system may provide an LCNC development platform to the computing device. The LCNC development platform may be configured to enable the user of the computing device to develop a software bot by using a graphical user interface (GUI) of the LCNC development platform to drag and drop application components of the software bot. Then, the computer system may receive a configuration of the software bot from the computing device via the LCNC development platform, with the configuration of the software bot comprising a configuration of the application components of the software bot and an identification of the data file, and then run the software bot using the received configuration of the software bot. The software bot may be configured to generate a request comprising the type of call method, a payload, and a token using the data file, with the generating of the request comprising converting the corresponding data of the one or more objects into the payload in a format required by the API based on the identification of the API, the metadata, and the corresponding data of the one or more objects, and the software bot being further configured to transmit the generated request to the API.

By enabling a user to configure a software bot to communicate with an API using an LCNC development platform along with a data file having a predefined template, as disclosed herein, the techniques disclosed in the present disclosure overcome the technical problem of static software bots that rely on repeated reprogramming for successful communication with API's. The features of the present disclosure result in a software bot that does not need to be reprogrammed repeatedly in order to stay up-to-date with API requirements, but rather provides an improved user interface that enables the user to effectively and efficiently configure a software bot to dynamically conform API requests to the requirements of the API using the predefined template. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and API servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
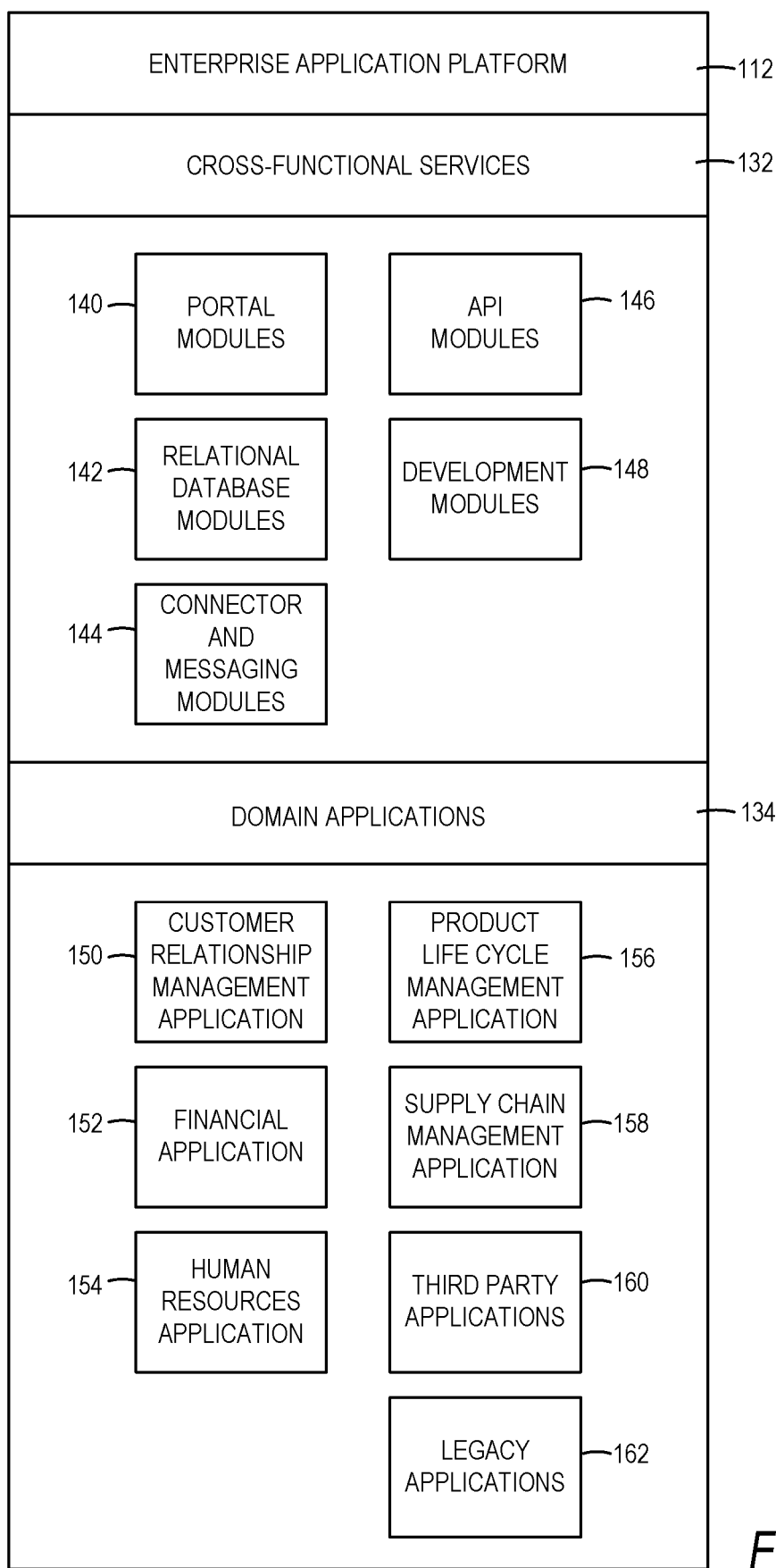
FIG. 2 is a block diagram illustrating example enterprise applications and services in an enterprise application platform.

FIG. 2 is a block diagram illustrating example enterprise applications and services in an enterprise application platform 112. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
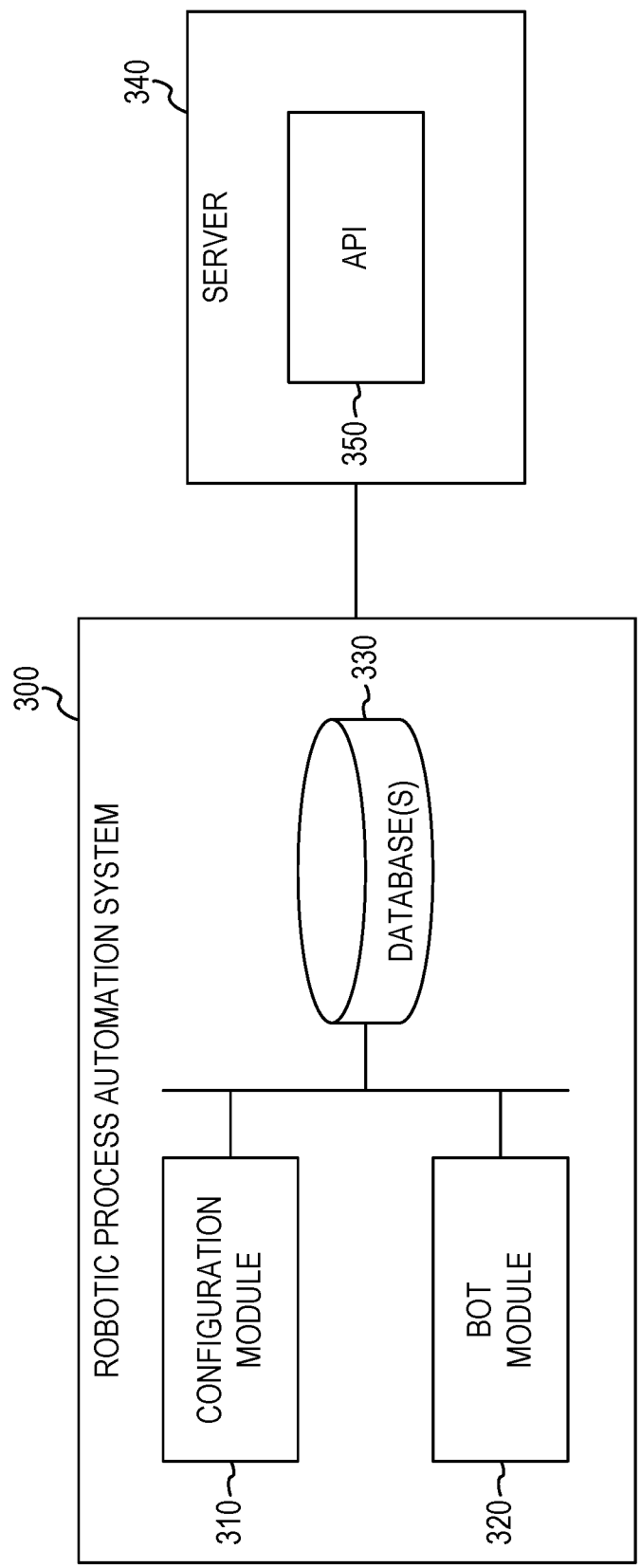
FIG. 3 is a block diagram illustrating an example robotic process automation system.

FIG. 3 is a block diagram illustrating an example robotic process automation system 300. In some example embodiments, the robotic process automation system 300 comprises any combination of one or more of a configuration module 310, a bot module 320, and one or more database(s) 330. The configuration module 310, the bot module 320, and the database(s) 330 can reside on a computer system, or other machine, having a memory and at least one processor (not shown). In some embodiments, the configuration module 310, the bot module 320, and the database(s) 330 are incorporated into the enterprise application platform 112 in FIGS. 1 and 2. However, it is contemplated that other configurations of the configuration module 310, the bot module 320, and the database(s) 330 are also within the scope of the present disclosure.

In some example embodiments, one or more of the configuration module 310 and the bot module 320 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input. In some example embodiments, one or more of the configuration module 310 and the bot module 320 are configured to receive user input. For example, one or more of the configuration module 310 and the bot module 320, can present one or more graphical user interface (GUI) elements (e.g., drop-down menu, selectable buttons, text field) with which a user can submit input. In some example embodiments, one or more of the configuration module 310 and the bot module 320 are configured to perform various communication functions to facilitate the functionality described herein, such as by communicating with a computing device (e.g., the small device client machine 122, the client machine 116, or the client/server machine 117) via the network 114 using a wired or wireless connection.

In some example embodiments, the robotic process automation system 300 is communicatively coupled to a server 340. For example, the robotic process automation system 300 may communicate with the server 340 via a network (e.g., via the network 114 in FIG. 1). The server 340 may comprise any computer system that is configured to respond to requests transmitted to it via a network connection. In some example embodiments, the server 340 comprises an API 350. The API 350 may comprise a type of software interface or intermediary that enables communicate between two software entities, such as between two software applications. Using the API 350, two software programs can send and retrieve information between each other. In some example embodiments, the API 350 comprises a web service that listens for and responds to requests at a particular port over a network. For example, the API 350 may comprise a web service that generates invoices in response to a request using data provided in the request. Other types of API's and web services are also within the scope of the present disclosure. Although FIG. 3 shows the server 340 having only one API 350, the server 340 may comprise multiple API's 350, with each API 350 performing a different function.

The robotic process automation system 300 may be configured to enable a user to configure a software bot to communicate with the API 350. The robotic process automation system 300 provides the user with tools to build the software bot to dynamically generate a request to be transmitted to the API 350 in conformity with the most recent requirements of the API 350 without the user having to write or rewrite code for the software bot. In some example embodiments, the configuration module 310 is configured to provide, to a computing device of a user (e.g., to the client machine 116 or to the small device client machine 122 in FIG. 1), a data file having a predefined template, which may be configured to receive API information for a request to the API 350. FIG. 4 illustrates an example GUI 400 of a predefined template of a data file in which a user may enter API information for a request to the API 350. The predefined template may comprise selectable user interface elements configured to trigger display of a corresponding sheet, page, or view of the predefined template. For example, in FIG. 4, the predefined template comprises selectable user interface elements 410, 420, 430, and 440.

The selectable user interface element 410, which has been selected by the user in the example shown in FIG. 4, is configured to, in response to its selection, trigger a display of a page or sheet that is configured to receive header level data for the request to the API 350. The header level data is data that specifies the context of the request, such as an identification (e.g., a web service Uniform Resource Locator) of the API 350, an identification of a credential for accessing the API 350, a type of call method of the request to the API 350 (e.g., HTTP request methods, such as POST), and a path for an output file resulting from a response from the API 350 to the request. In some example embodiments, the predefined template comprises a corresponding dedicated field for each of the different types of header level data, thereby enabling the user to provide the corresponding header level data via the corresponding dedicated field. For example, in FIG. 4, user may enter the identification of an API via a dedicated field 412, an identification of a credential for accessing the API via a dedicated field 414, a type of call method via a dedicated field 416, and a path for an output file via a dedicated field 418.

Figure 5:
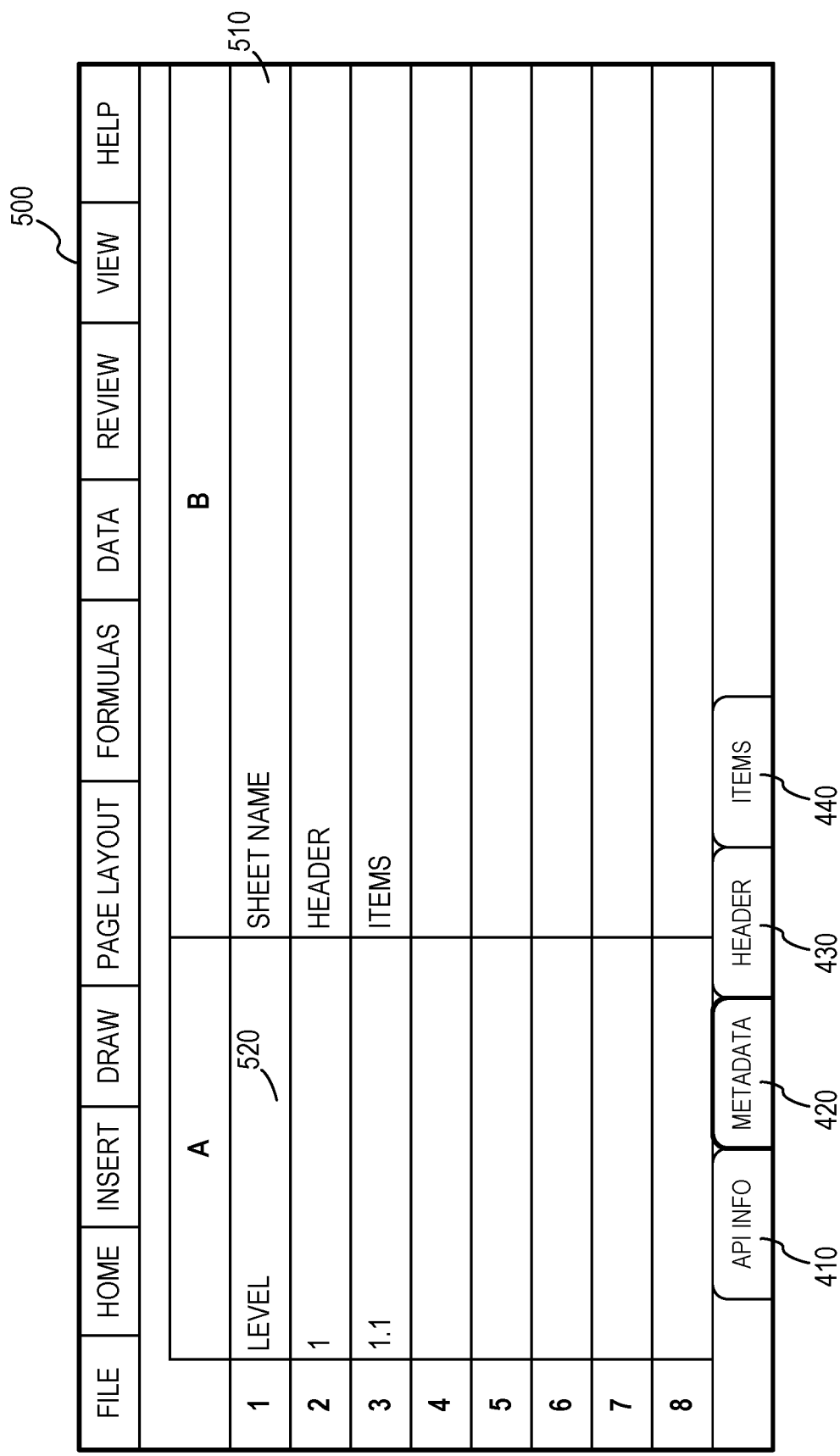
FIG. 5 illustrates an example GUI of the predefined template of the data file in which the user may enter metadata identifying one or more objects for the request to the API.

The selectable user interface element 420 may be configured to, in response to its selection, trigger a display of a sheet, page, or view that is configured to receive metadata identifying one or more objects. FIG. 5 illustrates an example GUI 500 of the predefined template of the data file in which the user may enter metadata identifying one or more objects for the request to the API. In the example shown in FIG. 5, the user has selected the selectable user interface element 420. The predefined template may comprise fields for the metadata identifying different objects. In the example shown in FIG. 5, the predefined template comprises a column 510 of fields configured to receive identifications of objects to be included in the request to the API 350, and the user has entered "HEADER" as an identification of a first type of object (e.g., header information to be used in generating an invoice) to be included in the request to the API 350, as well as "ITEMS" as an identification of a second type of object (e.g., product items to be used in generating an invoice) to be included in the request to the API 350.

In some example embodiments, the predefined template is configured to maintain a recursive hierarchy between the corresponding data items of the types of objects identified in column 510 data items. A recursive hierarchy is a data hierarchy in which all levels of data are from the same data table, and the parent-child relationships between levels are defined in the same source table. The data file may comprise a spreadsheet file (e.g., a MICROSOFT® EXCEL®) that is configured to maintain a parent-child relationship between data items in the spreadsheet file. Other types of data files are also within the scope of the present disclosure, including, but not limited to, comma-separated values (CSV) files.

In FIG. 5, the predefined template comprises a column 520 of fields configured to receive a hierarchy level for the corresponding object in column 510 of the predefined template. For example, in FIG. 5, the user has specified the "HEADER" object as having a hierarchy level of 1 and the "ITEMS" object as having a hierarchy level of 1.1 using the fields of column 520, thereby indicating that the "HEADER" object is a parent and the object "ITEMS" is a child in a parent-child relationship.

The predefined template may be configured to add a corresponding field for each corresponding data of each one of the objects identified in the predefined template in response to the user of the computing device adding the metadata identifying the objects. For example, in FIG. 5, the predefined template may be configured to add the selectable user interface elements 430 and 440 and their corresponding pages, sheets, or views in response to the user adding "HEADER" and "ITEMS" to the fields of column 510.

The selectable user interface element 430 is configured to, in response to its selection, trigger a display of a sheet, page, or view that is configured to receive corresponding data for one level of objects for the request to the API 350. FIG. 6 illustrates an example GUI 600 of the predefined template of the data file in which the user may enter corresponding data for one level of objects for the request to the API 350. In FIG. 6, the user has selected the selectable user interface element 430, thereby resulting in the display of the GUI 600 of the predefined template, which comprises fields in which the user may enter corresponding data for the "HEADER" object. For example, the user may enter a fiscal year for an invoice in field 613, a company code for the invoice in field 614, a document date for the invoice in field 615, a posting date for the invoice in field 616, and an invoicing party for the invoice in field 617. Other configurations of fields are also within the scope of the present disclosure. In FIG. 6, the predefined template also comprises fields in which the user may enter hierarchy data for each corresponding data item (e.g., for each row of data). For example, the user may enter a parent sequence value (e.g., indicating a hierarchy level of the parent of the data item) in a field 611 and a child sequence (e.g., indicating a hierarchy level of the data item) in a field 612.

The selectable user interface element 440 is configured to, in response to its selection, trigger a display of a sheet, page, or view that is configured to receive corresponding data for another level of objects for the request to the API 350. FIG. 7 illustrates an example GUI 700 of the predefined template of the data file in which the user may enter corresponding data for another level of objects for the request to the API 350.

In FIG. 7, the user has selected the selectable user interface element 440, thereby resulting in the display of the GUI 700 of the predefined template, which comprises fields in which the user may enter corresponding data for the "ITEMS" object. For example, the user may enter a fiscal year for an invoice in field 713, a supplier invoice item for the invoice in field 714, a purchase order number for the invoice in field 715, and a purchase order item number in field 616. Other configurations of fields are also within the scope of the present disclosure. In FIG. 7, the predefined template also comprises fields in which the user may enter hierarchy data for each corresponding data item (e.g., for each row of data). For example, the user may enter a parent sequence value (e.g., indicating a hierarchy level of the parent of the data item) in a field 711 and a child sequence (e.g., indicating a hierarchy level of the data item) in a field 712.

Figure 8:
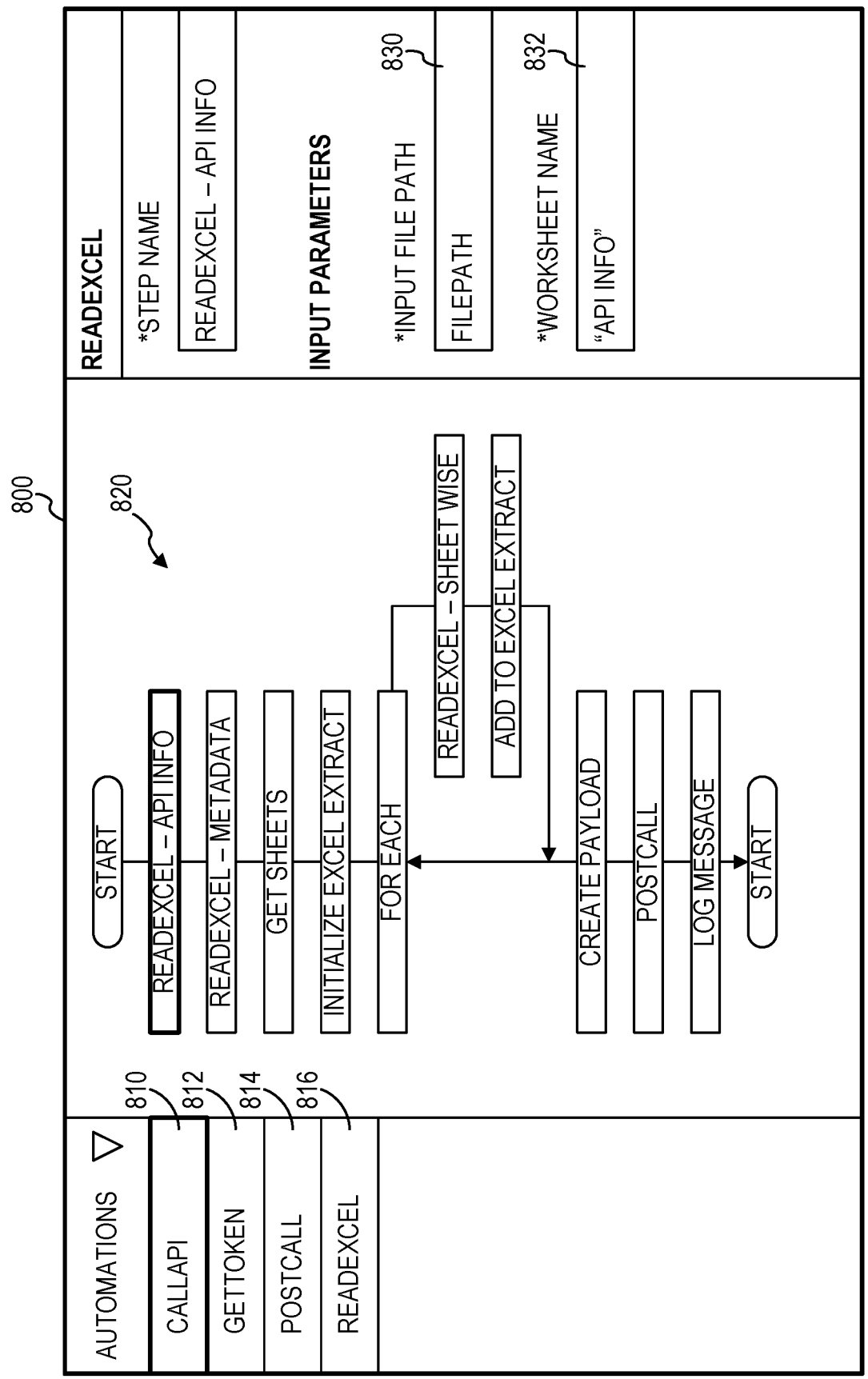
FIG. 8 illustrates an example GUI of a low-code no-code (LCNC) development platform.

In some example embodiments, the configuration module 310 is configured to provide an LCNC development platform to the computing device. The LCNC development platform may be configured to enable the user of the computing device to develop a software bot by using a GUI of the LCNC development platform to drag and drop application components of the software bot. FIG. 8 illustrates an example GUI 800 of an LCNC development platform. In the example shown in FIG. 8, the GUI 800 comprises a region (e.g., a panel) in which the automations of the software bot being built by the LCNC development platform are configured and displayed, a region of in which the application components of each automation are configured and displayed, and a region in which parameters of each automation are configured and displayed.

In FIG. 8, the region in which the automations of the software bot are configured and displayed includes four automation blocks: a "CALLAPI" block indicated by a selectable user interface element 810, a "GETTOKEN" block indicated by a selectable user interface element 812, a "POSTCALL" block indicated by a selectable user interface element 814, and a "READEXCEL" block indicated by a selectable user interface element 816. The selection of one of the selectable user interface elements 810, 812, 814, or 816 may trigger the display of the application components 820 of the corresponding automation block of the selected user interface element. The application components 820 may be displayed as selectable user interface elements that, when selected by the user, cause the selectable user interface elements for the parameters corresponding to the selected application component 820 to be displayed. The user may then configure the parameters corresponding to the selected application components 820 using the selectable user interface elements for the parameters. For example, the user may select a selectable user interface element 830 to enter, select, or otherwise specify an input file path for a selected application component 820 (e.g., the "READEXCEL—API INFO" application component in FIG. 8), and may also select a selectable user interface element 832 to enter, select, or otherwise specify a particular worksheet name to be used as an input parameter for the selected application component 820. Other ways of enabling the user to configure the input parameters for the application components 820 of the automation blocks of the software bot are also within the scope of the present disclosure.

The user may select the data file with the predefined template as an input parameter for any application component 820, thereby configuring one or more of the automation blocks of the software bot to automatically use the predefined template of the data file in generating a request for the API 350. In some example embodiments, the configuration module 310 is configured to receive a configuration of the software bot from the computing device via the LCNC development platform. The configuration of the software bot may comprise a configuration of the application components 820 of the software bot and an identification of the data file, such as via configuration by the user of one or more input parameters provided via the LCNC development platform. Although not shown in FIG. 8, the GUI 800 of the LCNC development platform may comprise selectable user interface elements that the user may interact with to add, remove, and configure the automation blocks of the software bot and to drag and drop application components 820 into each automation block, as well as to save a configuration of the elements of the software bot that have been configured by the user using the LCNC development platform.

In some example embodiments, the bot module 320 is configured to run the software bot using the received configuration of the software bot. The software bot may be configured to generate a request comprising the type of call method (e.g., an HTTP request method, such as POST), a payload, and a token using the data file. The generating of the request may comprise converting the corresponding data of the one or more objects into the payload in a format required by the API based on the identification of the API, the metadata, and the corresponding data of the one or more objects. For example, the bot module 320 may retrieve the data file from the database(s) 330 based on the identification of the data file in the configuration of the software bot, and may also retrieve, from the database(s) 330, one or more rules for the format required by the API 350 based on the identification of the API 350.

The bot module 320 may then convert the corresponding data of the object(s) saved in the predefined template into the payload in the format required by the API 350 based on the retrieved rule(s) for the format, the metadata, and the corresponding data of the one or more objects. The rule(s) for the format may indicate what type of parameters need to be included in the request and a particular format (e.g., order) in which the parameters need to be configured in the request. The metadata may be used to determine which data corresponds to which parameter in order to conform with the rule(s) for the format of the request to the API 350.

In some example embodiments, the bot module 320 may be further configured to, in generating the request, generate the token to be included in the request using the identification of the credential saved in the predefined template. For example, the bot module 320 may use the identification of the credential to locate the credential for use in generating the token.

The bot module 320 may be configured to transmit the generated request to the API 350 and to receive a response from the API 350. In response to receiving a response from the API 350 to the request, the bot module 320 may process data of the response and save the processed data in the output file specified in the predefined template. The output file may then be accessed by the user or other users for subsequent use, such as in one or more services or applications of the enterprise application platform 112.

Figure 9:
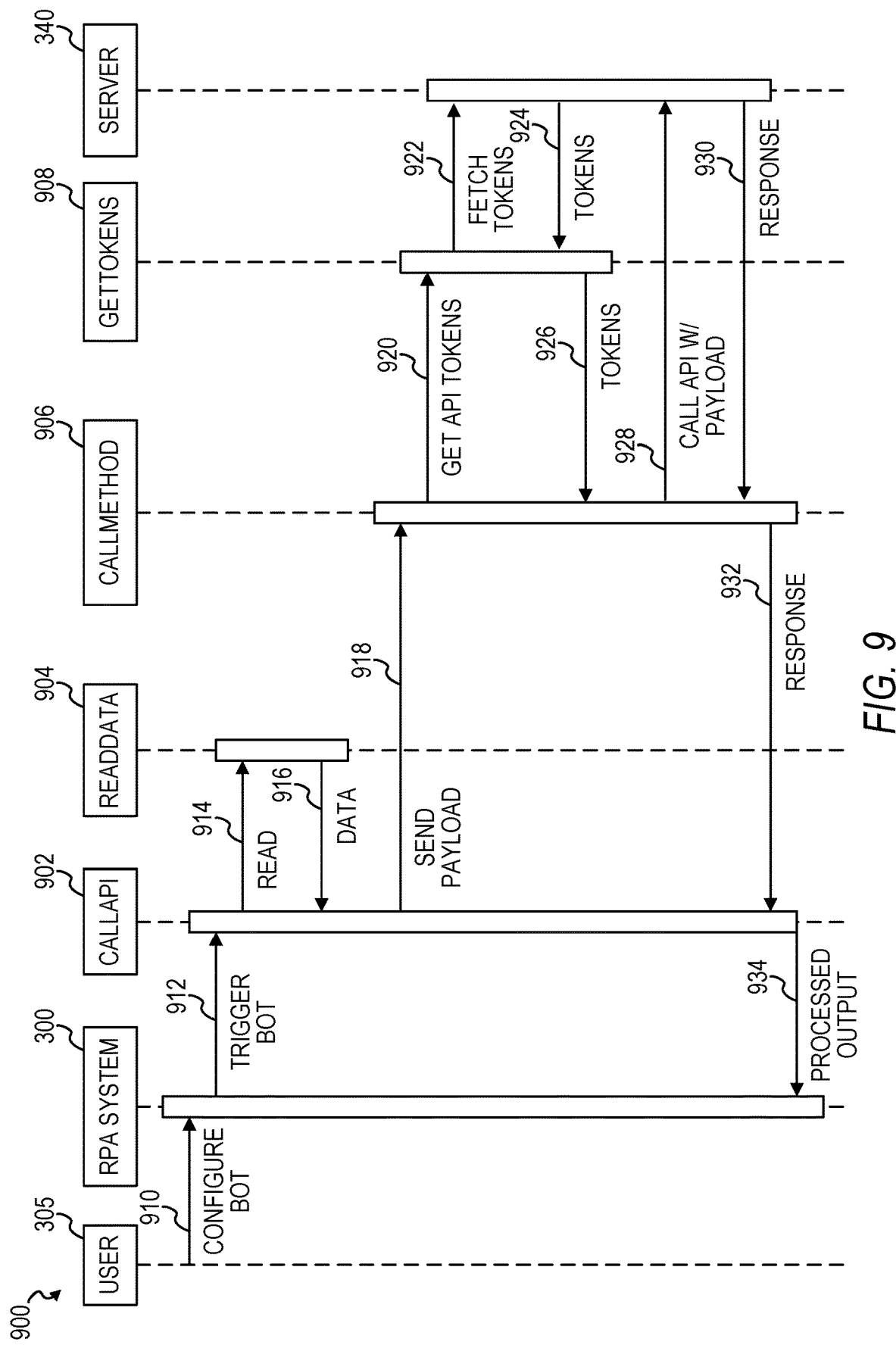
FIG. 9 is an example sequence diagram of a method for implementing a dynamic API bot for robotic process automation.

FIG. 9 is an example sequence diagram of a method 900 for implementing a dynamic API bot for robotic process automation. At step 910, a user configures the software bot via the robotic process automation system 300, such as by using the predefined template of the data file discussed above with respect to FIGS. 4-7 and the LCNC development platform discussed above with respect to FIG. 8. Then, the robotic process automation system 300 runs the configured software bot at step 912. At some point during the running of the configured software bot, the robotic process automation system 300 triggers the software bot to generate a request to be transmitted to the API 350 on the server 340. The robotic process automation system 300 may trigger the generation of the request at a user-defined schedule (e.g., on the last day of every month), on occurrence of a detected event (e.g., in response to a detection of a purchase being completed), or in response to an explicit command from a user (e.g., the user selecting a user interface element corresponding to a calling of the API 350).

In some example embodiments, the software bot includes four automation blocks that are used in generating and transmitting the request: a "CALLAPI" automation block 902, a "READDATA" automation block 904, a "CALLMETHOD" automation block 906, and a "GETTOKENS" automation block 908. The "CALLAPI" automation block 902 is the main automation block that gets executed and is responsible for calling the other automation blocks in a particular sequence defined by the configuration of the software bot. The "READDATA" automation block 904 is the automation block that is responsible for reading the raw data from the predefined template of the data file. The "CALLMETHOD" automation block 906 is the automation block that is responsible for making the call to the API 350. The "GETTOKENS" automation block 908 is the automation block that is responsible for obtaining authorization tokens (e.g., a cross-site request forgery token) from the server 340 for accessing the API 350.

At step 914, the "CALLAPI" automation block 902 calls the "READDATA" automation block 904 to read the raw data from the predefined template of the data file, and the "READDATA" automation block 904 returns the read raw data from the predefined template of the data file to the "CALLAPI" automation block 902 at step 916. Next, at step 918, the "CALLAPI" automation block 902 generates the payload for the request to the API 350 using the raw data from the predefined template of the data file, using the raw data to convert the data from the data file into the format required by the API 350, and then sends the generated payload to the "CALLMETHOD" automation block 906.

The "CALLMETHOD" automation block 906 sends an instruction, at step 920, to the "GETTOKENS" automation block 908" to get a token for accessing the API 350. The instruction may include the credential for accessing the API 350. Next, the "GETTOKENS" automation block 908 may fetch the token for accessing the API 350 from the server 340 using the credential, at step 922, and the server 340 may return the token to the "GETTOKENS" automation block 908, at step 924, and the "GETTOKENS" automation block 908 may relay the token to the "CALLMETHOD" automation block 906, at step 926.

Once the "CALLMETHOD" automation block 906 receives the token, it may include the token in the generated request along with the payload in a call, at step 928, to the API 350 on the server 340. In response to the call, the API 350 on the server 340 may process the request and return a response to the request, at step 930. At step 930, the response to the request may be transmitted to the "CALLMETHOD" automation block 906, which may relay the response to the "CALLAPI" automation block 902, at step 932. Finally, at step 934, the "CALLAPI" automation block 902 may process the response, generating a processed output, which may be provided to the user 305 via the robotic process automation system 300 or used in some other function of the robotic process automation system 300.

Figure 10:
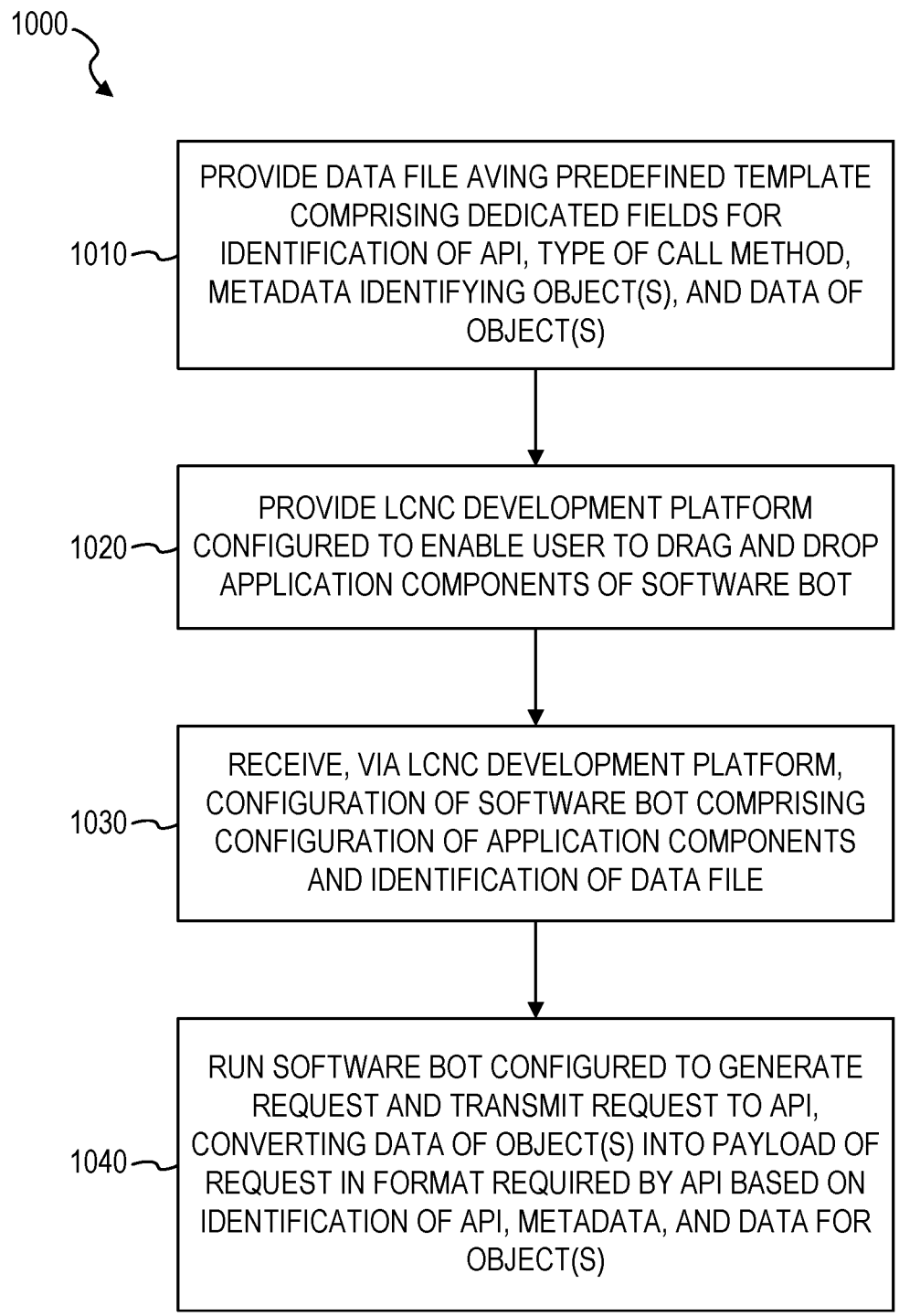
FIG. 10 is a flowchart illustrating an example method of implementing a dynamic API bot for robotic process automation.

FIG. 10 is a flowchart illustrating an example method 1000 of implementing a dynamic API bot for robotic process automation. The method 1000 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1000 are performed by the robotic process automation system 300 of FIG. 3 or any combination of one or more of its components (e.g., the configuration module 310, the bot module 320).

At operation 1010, the robotic process automation system 300 provides, to a computing device of a user, a data file having a predefined template (e.g., the predefined template discussed above with respect to FIGS. 4-7). In some example embodiments, the predefined template comprises dedicated fields for an identification of an API, a type of call method, metadata identifying one or more objects, and corresponding data of each one of the one or more objects. The predefined template of the data file may further comprise a dedicated field for an identification of a credential for accessing the API. The predefined template may be configured to add a corresponding field for each corresponding data of each one of the one or more objects in response to the user of the computing device adding the metadata identifying the one or more objects. In some example embodiments, the predefined template is configured to maintain a recursive hierarchy between data items. For example, the data file may comprise a spreadsheet file (e.g., a MICROSOFT® EXCEL®) that is configured to maintain a parent-child relationship between data items in the spreadsheet file. The API may comprise a web service. However, other types and configurations of the API are also within the scope of the present disclosure.

The robotic process automation system 300, at operation 1020, provide an LCNC development platform to the computing device (e.g., the LCNC development platform discussed above with respect to FIG. 8). In some example embodiments, the LCNC development platform is configured to enable the user of the computing device to develop a software bot by using a graphical user interface (GUI) of the LCNC development platform to drag and drop application components of the software bot.

Next, at operation 1030, the robotic process automation system 300 may receive a configuration of the software bot from the computing device via the LCNC development platform. The configuration of the software bot may comprise a configuration of the application components of the software bot and an identification of the data file.

Then, the robotic process automation system 300 may run the software bot, at operation 1040, using the received configuration of the software bot. In some example embodiments, the software bot is configured to generate a request comprising the type of call method, a payload, and a token using the data file. The generating of the request may comprise converting the corresponding data of the one or more objects into the payload in a format required by the API based on the identification of the API, the metadata, and the corresponding data of the one or more objects. The generating of the request may further comprise generating a token included in the request using the identification of the credential. Furthermore, the software bot may also be configured to transmit the generated request to the API.

It is contemplated that any of the other features described within the present disclosure can be incorporated into the method 1000.

Figure 11:
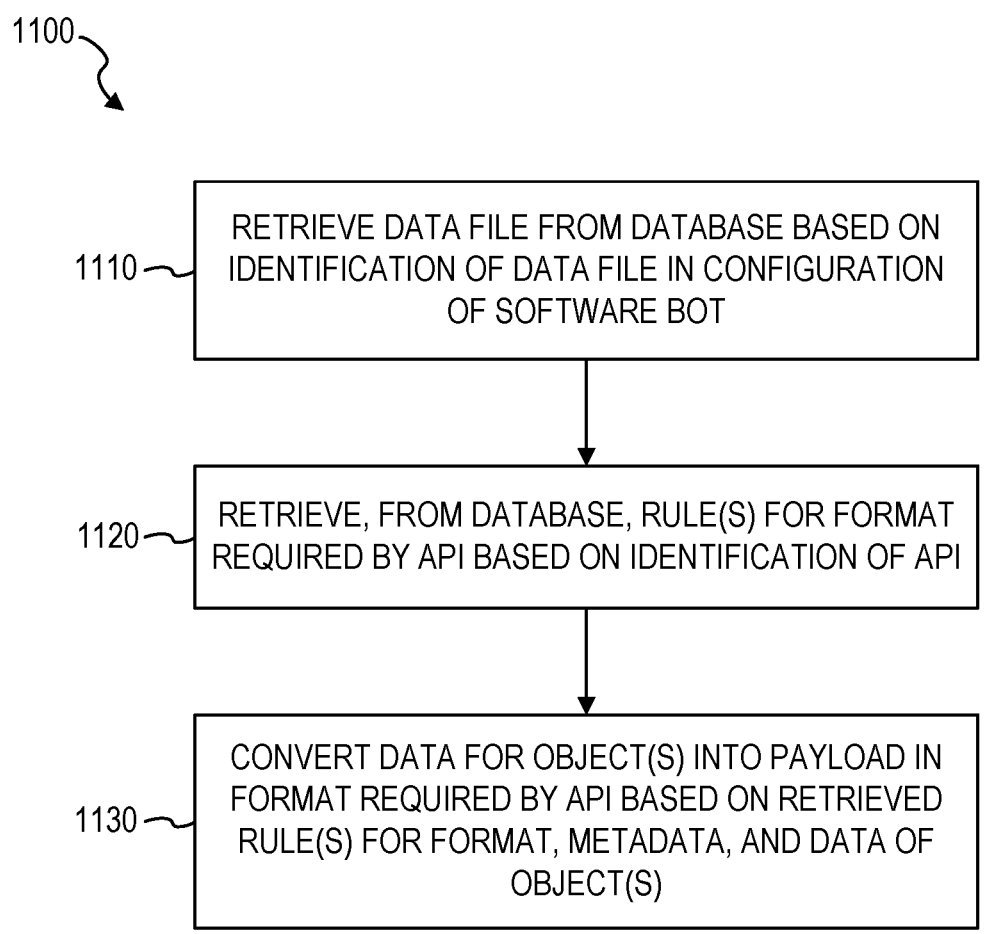
FIG. 11 is a flowchart illustrating an example method of converting corresponding data of one or more objects into a payload in a format required by an API.

FIG. 11 is a flowchart illustrating an example method 1100 of converting corresponding data of one or more objects into a payload in a format required by an API. The method 1100 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1100 are performed by the robotic process system 300 of FIG. 3 or any combination of one or more of its components (e.g., the configuration module 310, the bot module 320).

At operation 1110, the robotic process automation system 300 retrieves the data file from a database based on the identification of the data file in the configuration of the software bot.

At operation 1120, the robotic process automation system 300 retrieves, from the database, one or more rules for the format required by the API based on the identification of the API.

At operation 1130, the robotic process automation system 300 converts the corresponding data of the one or more objects into the payload in the format required by the API based on the retrieved one or more rules for the format, the metadata, and the corresponding data of the one or more objects.

It is contemplated that any of the other features described within the present disclosure can be incorporated into the method 1100.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: providing, to a computing device of a user, a data file having a predefined template, the predefined template comprising dedicated fields for an identification of an application programming interface (API), a type of call method, metadata identifying one or more objects, and corresponding data of each one of the one or more objects; providing an LCNC development platform to the computing device, the LCNC development platform being configured to enable the user of the computing device to develop a software bot by using a graphical user interface (GUI) of the LCNC development platform to drag and drop application components of the software bot; receiving a configuration of the software bot from the computing device via the LCNC development platform, the configuration of the software bot comprising a configuration of the application components of the software bot and an identification of the data file; and running the software bot using the received configuration of the software bot, the software bot being configured to generate a request comprising the type of call method, a payload, and a token using the data file, the generating of the request comprising converting the corresponding data of the one or more objects into the payload in a format required by the API based on the identification of the API, the metadata, and the corresponding data of the one or more objects, the software bot being further configured to transmit the generated request to the API.

Example 2 includes the computer-implemented method of example 1, wherein the predefined template of the data file further comprises a dedicated field for an identification of a credential for accessing the API, and the generating of the request further comprises generating a token included in the request using the identification of the credential.

Example 3 includes the computer-implemented method of example 1 or example 2, wherein the predefined template is configured to maintain a recursive hierarchy between data items.

Example 4 includes the computer-implemented method of any one of examples 1 to 3, wherein the data file comprises a spreadsheet file.

Example 5 includes the computer-implemented method of any one of examples 1 to 4, wherein the API comprises a web service.

Example 6 includes the computer-implemented method of any one of examples 1 to 5, wherein the predefined template is configured to add a corresponding field for each corresponding data of each one of the one or more objects in response to the user of the computing device adding the metadata identifying the one or more objects.

Example 7 includes the computer-implemented method of any one of examples 1 to 6, wherein the converting the corresponding data of the one or more objects into the payload in the format required by the API comprises: retrieving the data file from a database based on the identification of the data file in the configuration of the software bot; retrieving, from the database, one or more rules for the format required by the API based on the identification of the API; and converting the corresponding data of the one or more objects into the payload in the format required by the API based on the retrieved one or more rules for the format, the metadata, and the corresponding data of the one or more objects.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 12:
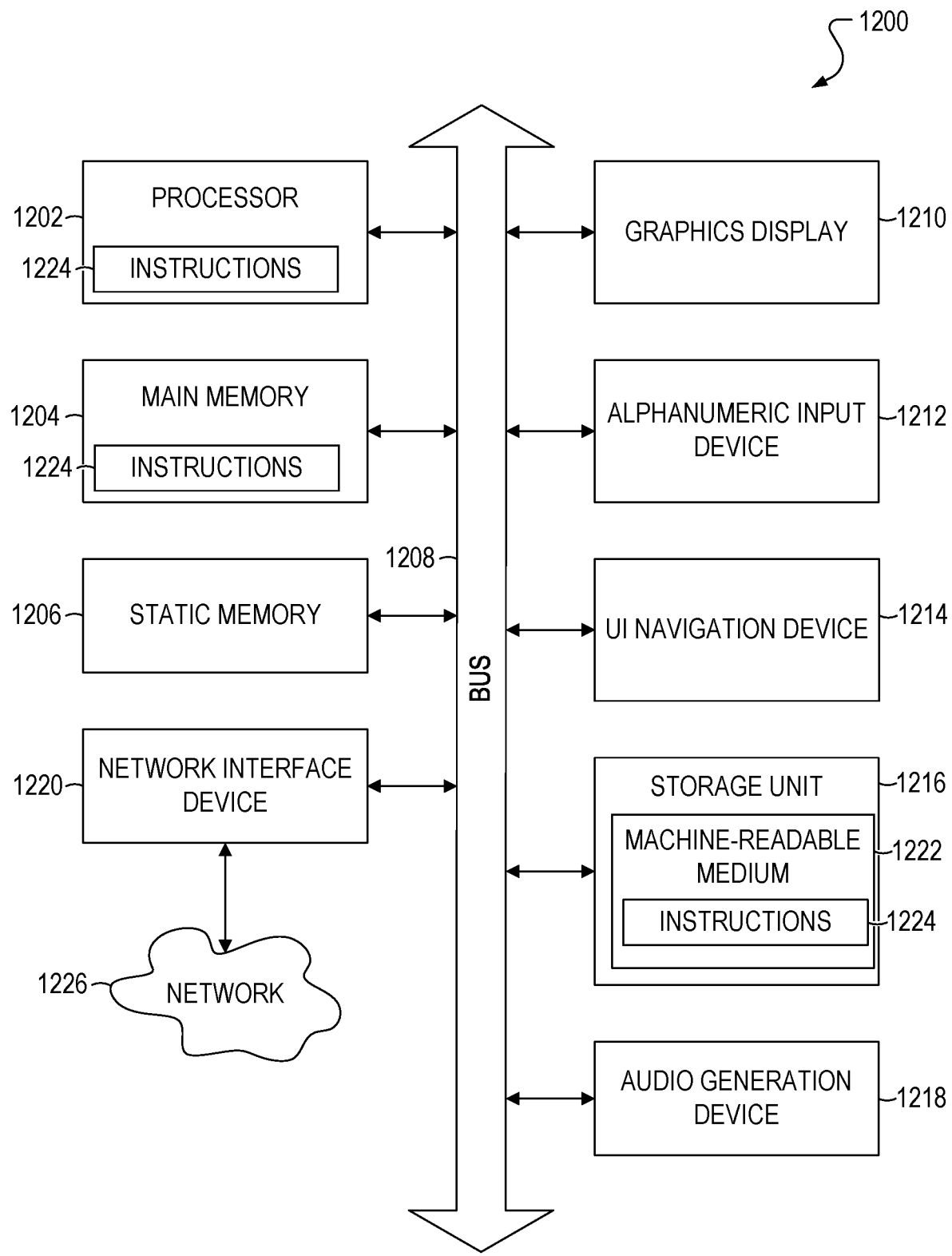
FIG. 12 is a block diagram of an example computer system on which methodologies described herein can be executed.

FIG. 12 is a block diagram of a machine in the example form of a computer system 1200 within which instructions 1224 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204, and a static memory 1206, which communicate with each other via a bus 1208. The computer system 1200 may further include a graphics or video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit (e.g., a disk drive unit) 1216, an audio or signal generation device 1218 (e.g., a speaker), and a network interface device 1220.

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:
   providing, to a computing device of a user, a data file having a predefined template, the predefined template comprising dedicated fields for an identification of an application programming interface (API), a type of call method, metadata identifying one or more objects, and corresponding data of each one of the one or more objects;
   providing a low-code no-code (LCNC) development platform to the computing device, the LCNC development platform being configured to enable the user of the computing device to develop a software bot by using a graphical user interface (GUI) of the LCNC development platform to drag and drop application components of the software bot;
   receiving a configuration of the software bot from the computing device via the LCNC development platform, the configuration of the software bot comprising a configuration of the application components of the software bot and an identification of the data file; and
   running the software bot using the received configuration of the software bot, the software bot being configured to generate a request comprising the type of call method, a payload, and a token using the data file, the generating of the request comprising converting the corresponding data of the one or more objects into the payload in a format required by the API based on the identification of the API, the metadata, and the corresponding data of the one or more objects, the software bot being further configured to transmit the generated request to the API.

2. The computer-implemented method of claim 1, wherein the predefined template of the data file further comprises a dedicated field for an identification of a credential for accessing the API, and the generating of the request further comprises generating a token included in the request using the identification of the credential.

3. The computer-implemented method of claim 1, wherein the predefined template is configured to maintain a recursive hierarchy between data items.

4. The computer-implemented method of claim 1, wherein the data file comprises a spreadsheet file.

5. The computer-implemented method of claim 1, wherein the API comprises a web service.

6. The computer-implemented method of claim 1, wherein the predefined template is configured to add a corresponding field for each corresponding data of each one of the one or more objects in response to the user of the computing device adding the metadata identifying the one or more objects.

7. The computer-implemented method of claim 1, wherein the converting the corresponding data of the one or more objects into the payload in the format required by the API comprises:
   retrieving the data file from a database based on the identification of the data file in the configuration of the software bot;
   retrieving, from the database, one or more rules for the format required by the API based on the identification of the API; and
   converting the corresponding data of the one or more objects into the payload in the format required by the API based on the retrieved one or more rules for the format, the metadata, and the corresponding data of the one or more objects.

8. A system of comprising:
   at least one hardware processor; and
   a non-transitory computer-readable medium storing executable instructions that, when executed, cause the at least one processor to perform operations comprising:
   providing, to a computing device of a user, a data file having a predefined template, the predefined template comprising dedicated fields for an identification of an application programming interface (API), a type of call method, metadata identifying one or more objects, and corresponding data of each one of the one or more objects;
   providing a low-code no-code (LCNC) development platform to the computing device, the LCNC development platform being configured to enable the user of the computing device to develop a software bot by using a graphical user interface (GUI) of the LCNC development platform to drag and drop application components of the software bot;
   receiving a configuration of the software bot from the computing device via the LCNC development platform, the configuration of the software bot comprising a configuration of the application components of the software bot and an identification of the data file; and
   running the software bot using the received configuration of the software bot, the software bot being configured to generate a request comprising the type of call method, a payload, and a token using the data file, the generating of the request comprising converting the corresponding data of the one or more objects into the payload in a format required by the API based on the identification of the API, the metadata, and the corresponding data of the one or more objects, the software bot being further configured to transmit the generated request to the API.

9. The system of claim 8, wherein the predefined template of the data file further comprises a dedicated field for an identification of a credential for accessing the API, and the generating of the request further comprises generating a token included in the request using the identification of the credential.

10. The system of claim 8, wherein the predefined template is configured to maintain a recursive hierarchy between data items.

11. The system of claim 8, wherein the data file comprises a spreadsheet file.

12. The system of claim 8, wherein the API comprises a web service.

13. The system of claim 8, wherein the predefined template is configured to add a corresponding field for each corresponding data of each one of the one or more objects in response to the user of the computing device adding the metadata identifying the one or more objects.

14. The system of claim 8, wherein the converting the corresponding data of the one or more objects into the payload in the format required by the API comprises:
retrieving the data file from a database based on the identification of the data file in the configuration of the software bot;
retrieving, from the database, one or more rules for the format required by the API based on the identification of the API; and
converting the corresponding data of the one or more objects into the payload in the format required by the API based on the retrieved one or more rules for the format, the metadata, and the corresponding data of the one or more objects.

15. A non-transitory machine-readable storage medium tangibly embodying a set of instructions that, when executed by at least one hardware processor, causes the at least one processor to perform operations comprising:
providing, to a computing device of a user, a data file having a predefined template, the predefined template comprising dedicated fields for an identification of an application programming interface (API), a type of call method, metadata identifying one or more objects, and corresponding data of each one of the one or more objects;
providing a low-code no-code (LCNC) development platform to the computing device, the LCNC development platform being configured to enable the user of the computing device to develop a software bot by using a graphical user interface (GUI) of the LCNC development platform to drag and drop application components of the software bot;
receiving a configuration of the software bot from the computing device via the LCNC development platform, the configuration of the software bot comprising a configuration of the application components of the software bot and an identification of the data file; and
running the software bot using the received configuration of the software bot, the software bot being configured to generate a request comprising the type of call method, a payload, and a token using the data file, the generating of the request comprising converting the corresponding data of the one or more objects into the payload in a format required by the API based on the identification of the API, the metadata, and the corresponding data of the one or more objects, the software bot being further configured to transmit the generated request to the API.

16. The non-transitory machine-readable storage medium of claim 15, wherein the predefined template of the data file further comprises a dedicated field for an identification of a credential for accessing the API, and the generating of the request further comprises generating a token included in the request using the identification of the credential.

17. The non-transitory machine-readable storage medium of claim 15, wherein the predefined template is configured to maintain a recursive hierarchy between data items.

18. The non-transitory machine-readable storage medium of claim 15, wherein the data file comprises a spreadsheet file.

19. The non-transitory machine-readable storage medium of claim 15, wherein the API comprises a web service.

20. The non-transitory machine-readable storage medium of claim 15, wherein the predefined template is configured to add a corresponding field for each corresponding data of each one of the one or more objects in response to the user of the computing device adding the metadata identifying the one or more objects.

* * * * *